3,094,522
ALKANOYLTHIO AND PYRAZOLO ANDROSTANE DERIVATIVES
Arthur A. Patchett, Metuchen, and Glen E. Arth, Cranford, N.J., and Harvey Schwam, Woodside, N.Y., assignors to Merck & Co., Inc., Rahway, N.J., a corporation of New Jersey
No Drawing. Filed July 25, 1961, Ser. No. 126,509
24 Claims. (Cl. 260—239.5)

This invention is concerned generally with novel steroids and processes of preparing the same. More particularly, it relates to novel compounds having the following structure:

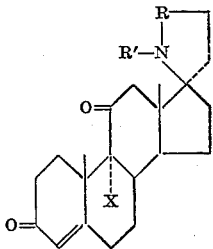

and wherein R stands for

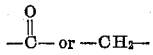

and wherein R' is hydrogen or alkyl when R is

and R' is hydrogen or acyl when R is —CH₂—, and wherein X is halogen. This invention also concerns closely related compounds, and in particular the 7α-alkanoylthio and the pyrazolo derivatives, and the Δ¹,⁴- and Δ⁴,⁶-analogues of the above compounds.

The above described compounds possess useful therapeutic properties as aldosterone inhibitors. These novel steroids block the salt-retaining effects of aldosterone and other salt retaining steroids so as to be useful in the treatment of diseases such as congestive heart failure, nephrosis and cirrohis of the kidney in which aldosterone secretion is increased.

In preparing our novel chemical compounds the starting material utilized is 3α-acetoxy-16-pregnene-11,20-dione (see Flow Sheet A). This compound is heated with hydroxylamine hydrochloride and an organic base such as pyridine to give 3α-acetoxy-16-pregnene-11,20-dione 20-oxime. The latter compound is treated with an aryl sulfonyl halide such as p-acetylaminobenzenesulfonyl chloride and an organic base followed by acid hydrolysis and reactylation to form 3α-acetoxy-5β-androstane-11,17-dione. This forms the 3α-acetoxy-5β-androstane-11,17-dione 17-oxime on heating with hydroxylamine hydrochloride and an organic base.

The 3α-acetoxy-5β-androstane-11,17-dione 17-oxime is converted to 3α-acetoxy-17β-nitro-5β-androstane-11β-ol by treating with N-bromosuccinimide in aqueous dioxane under oxidizing conditions, for example, with vigorous stirring over an extended period, to form the 3α-acetoxy-17α-bromo-17β-nitro-5β-androstane-11-one. The latter compound is then converted into 3α-acetoxy-17β-nitro-5β-androstane-11β-ol by reacting with sodium borohydride in aqueous tetrahydrofuran solution.

The 3α-acetoxy-17β-nitro-5β-androstane-11β-ol is reacted with methyl acrylate in the presence of base to give 3α-acetoxy-17α-[2'-methoxycarbonylethyl]-17β-nitro-5β-androstane-11β-ol. The latter compound is treated with methane sulfonyl chloride in the presence of an organic base such as pyridine to afford 3α-acetoxy-17α-[2'-methoxycarbonylethyl]-17β-nitro - 9(11) - 5β - androstene. Reduction of 3α-acetoxy-17α-[2'-methoxycarbonylethyl]-17β-nitro-9(15)-5β-androstene with zinc dust in acid solution forms 3-(3'α-acetoxy-17'β-amino-9'(11')-5'β-androstene-17'α-yl)-propionic acid lactam. The latter compound is converted into 3-(17'β-amino-3'α-hydroxy-9'(11')-5'β-androstene-17'α-yl)-propionic acid lactam, for example, by heating with an auqeous methanolic solution of alkali metal bicarbonate. The 3-(17'β-amino-3'α-hydroxy-9'(11')-5'β-androstene-17'α-yl)-propionic acid lactam is oxidized to 3-(17'β-amino-9'(11')-5'β-androstene-3'-one-17'α-yl)-propionic acid lactam, for example, with chromium trioxide in the presence of an organic base such as pyridine. The 3-(17'β-amino-9'(11')-5'β-androstene-3'-one-17'α-yl)-propionic acid lactam is converted into 3-(17'β-amino-4',9'(11')-androstadiene-3'-one-17'α-yl)-propionic acid lactam by treatment sequentially with bromine in hydrogen bromide and acetic anhydride and then with a mixture of lithium bromide and lithium carbonate in an organic solvent.

The 3-(17'β-amino-3'α-hydroxy-9'(11')-5'β-androstene-17'α-yl)-propionic acid lactam is converted into 3-(3'α-hydroxy-17'β-methylamino-9'(11')-5'β - androstene-17'α-yl)-propionic acid lactam by reaction first with dihydropyran in the presence of an acidic catalyst to form 3-(17'β-amino-3'α-hydroxy-9'(11')-5'β-androstene-17'α-yl)-propionic acid lactam 3α-tetrahydropyranyl ether. The latter compound is methylated, for example, using methyl iodide and sodium hydride and then treated with acid to give 3-(3'α-hydroxy-17'β-methylamino-9'(11')-5'β-androstene-17'α-yl)-propionic acid lactam. The 3-(3'α-hydroxy-17'β-methylamino-9'(11')-5'β-androstene-17'α-yl) - propionic acid lactam is then oxidized to 3-(17'β-methylamino-9'-(11')-5'β-androstene-3'-one-17'α-yl)-propionic acid lactam using chromium trioxide in pyridine. The 3-(17'β-methylamino-9'(11')-5'β-androstene-3'-one - 17'α-yl)-propionic acid lactam is converted into 3-(17'β-methylamino-4',9'(11')-androstadiene-3'-one-17'α - yl) - propionic acid lactam by treatment sequentially with bromine in a hydrogen bromide-acetic anhydride reagent and then with a mixture of lithium bromide and lithium carbonate in an organic solvent.

The 3-(17'β-amino-3'α-hydroxy-9'(11')-5'β-androstene-17'α-yl)-propionic acid lactam is reduced with lithium aluminum hydride, in a solvent such as dioxane to give 3α-hydroxy-9(11)-5β-androstene-17-spiro-2' - (1' - 2')β-pyrrolidene (see Flow Sheet B). The latter compound is converted into a 3α-acyloxy-9(11)-5β-androstane-17-spiro-2'-(1'-2')β-1'-acylpyrrolidene by treating with an acylating agent, e.g. a lower hydrocarbon carboxylic acid acylating agent such as benzoic anhydride or tertiary butyl acetyl chloride; a lower alkanoic anhydride or lower alkanoyl halide such as acetic anhydride, propionic anhydride or acetyl chloride; or a polybasic anhydride such as β,β-dimethylglutaric anhydride, succinic anhydride and the like, in the presence of an organic base such as pyridine.

The 3α-acyloxy-9(11)-5β - androstene-17-spiro-2'-(1'-2')β-1'-acylpyrrolidene is refluxed with an auqeous methanolic solution of alkali metal bicarbonate to give 3α-hydroxy-9(11)-5β-androstene-17-spiro-2'-(1'-2')β-1' - acylpyrrolidene.

3α-hydroxy-9(11)-5β - androstene-17-spiro-2'-(1'-2')β-1'-acylpyrrolidene can be converted to 4,9(11)-androstadiene-3-one-17-spiro-2'-(1'-2')β-1' - acylpyrrolidene in the same manner as that indicated above for the conversion of 3-(17'β-amino-3'α-hydroxy-9'(11')-5'β - androstene-17'-α-yl)-propionic acid lactam to 3-(17'β-amino-4',9'(11')-androstadien-3'-one-17'α-yl)-propionic acid lactam.

The 3-(17'β-amino-4',9'(11')-androstadien-3'-one-17'-α-yl)-propionic acid lactam, 3-(17'β-methylamino-4',9'-(11')-androstadien-3'-one-17'α-yl)-propionic acid lactam and 4,9(11)-androstadien-3-one-17-spiro-2'-(1'-2')β-1'-acylpyrrolidene may be converted into the corresponding 3 - (17'β-amino-9'α-fluoro-4'-androstene-3',11'-dione-17'-α-yl)-propionic acid lactam, 3-(9'α-fluoro-17'β-methylamino - 4'-androstene-3',11'-dione-17'α-yl)-propionic acid lactam, or 9α-fluoro-4-androstene-3,11-dione-17-spiro-2'-(1'-2')β-1'-acylpyrrolidene (see Flow Sheet C) by reacting first with N-bromosuccinimide in dioxane to form the corresponding 9α-bromo-11β-hydroxy-derivative; heating the latter compound with potassium acetate in absolute ethanol to obtain the corresponding 9β,11β-oxide; then converting the 9β,11β-oxide into the corresponding 9α-halo-11β-hydroxy-derivative and in particular the 9α-fluoro-11β-hydroxy-derivative, for example, by treating with anhydrous hydrogen fluoride in tetrahydrofuran; and finally oxidizing the 9α-fluoro-11β-hydroxy-derivative to obtain the corresponding 9α-fluoro-11-keto-compound. 9α - fluoro-4-androstene-3,11-dione-17-spiro-2'-(1'-2')β-pyrrolidene may be prepared by mineral acid hydrolysis of 9α-fluoro-4-androstene-3,11-dione -17-spiro-2'-(1'-2')β-1'-acylpyrrolidene, especially when the acyl group is readily hydrolyzed, as for example, when the acyl group is formyl.

The 3 - (17'β-amino-9'α-fluoro-4'-androstene-3',11'-dione-17'α-yl)-propionic acid lactam, 3-(9'α-fluoro-17'β-methylamino - 4'-androstene-3',11'-dione-17'α-yl)-propionic acid lactam and 9α-fluoro-4-androstene-3,11-dione-17-spiro-2'-(1'-2')β-1'-acylpyrrolidene are converted into the corresponding Δ1,4-analogues on treatment with selenium dioxide (see Flow Sheet D).

The 3 - (17'β-amino-9'α-fluoro-4'-androstene-3',11'-dione-17'α-yl)-propionic acid lactam, 3-(9'α-fluoro-17'β-methylamino - 4'-androstene-3',11'-dione-17'α-yl)-propionic acid lactam and 9α-fluoro-4-androstene-3,11-dione-17-spiro-2'-(1'-2')β-1'-acylpyrrolidene are converted into the corresponding 3-(7'α-alkanoylthio-17'β-amino-9'α-fluoro-4'-androstene-3',11'-dione-17'α-yl)-propionic acid lactam, 3-(7'α-alkanoylthio-9'α-fluoro-17'β-methylamino-4'-androstene-3',11'-dione-17'α-yl)-propionic acid lactam and 7α-alkanoylthio-4-androstene-3,11-dione-17-spiro-2'-(1' - 2')β-1'-acylpyrrolidene by dehydrogenation with chloranil to form the corresponding Δ4,6-analogue and then reacting the latter compound with a thioalkanoic acid. Among the radicals comprehended by the expression alkanoyl are formyl, acetyl, propionyl, butyryl, valeryl, hexanoyl, heptanoyl, octanoyl and branched-chain isomers thereof, said alkanoyl radicals being the acyl radicals of alkanoic acids containing fewer than nine carbon atoms.

The 3 - (17'β-amino-9'α-fluoro-4'-androstene-3'11'-dione-17'α-yl)-propionic acid lactam, 3-(9'α-fluoro-17'β-methylamino - 4' - androstene-3',11'-dione-17'α-yl)-propionic acid lactam and 9α-fluoro-4-androstene-3,11-dione-17-spiro-2'-(1'-2')β-1'-acylpyrrolidene are converted into the corresponding 3-(17'β-amino-[3',2'-c]pyrazolo-4'-androstene-11'-one-17'α-yl)-propionic acid lactam, 3-(17'β-methylamino - [3',2' - c]pyrazolo-4'-androstene-11'-one-17'α-yl)-propionic acid lactam and 9α-fluoro-[3,2-c]pyrazolo - 4-androstene-3,11-dione-17-spiro-2'-(1'-2')β-1'-acylpyrrolidene by first reacting with an alkyl formate and strong base in an inert atmosphere to form the corresponding 2-hydroxymethylene derivative, and then reacting the latter compound with hydrazine, or a monosubstituted hydrazine, to give the corresponding pyrazolo compound, which is exemplified in Flow Sheet D as compound 28.

The structure of the pyrazolo-compound designated in the flow sheet is based upon an interpretation of data according to the state of the art presently known to organic chemists. However, it is to be understood that no part of the specification will be materially defective if it should later be established that the correct structure of any of these compounds with respect to the position of the double bonds and the R'' substituent in the pyrazole ring is isomeric to the structure shown, and in particular if the following structure exists:

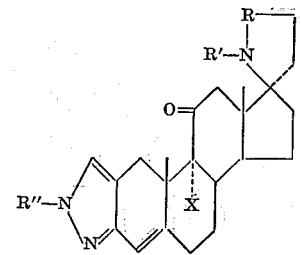

wherein R stands for

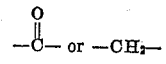 or —CH₂—

R' is hydrogen or alkyl when R is

and R' is acyl when R is —CH₂—, and R'' is hydrogen, alkyl, cycloalkyl, aryl or aralkyl and wherein X is halogen.

To form the pyrazolo compound the 2-hydroxymethylene-steroid is dissolved in a solvent such as absolute ethanol, and heated with hydrazine or an alkyl, cycloalkyl, aralkyl, or aryl substituted hydrazine in an inert atmosphere. A hydrazine salt may be used in the presence of a buffering agent such as sodium acetate. Among the substituted hydrazines which may be used for reaction with the above described 2-hydroxymethylene-steroid compounds in the process of our invention are: Alkylhydrazines, such as methylhydrazine, ethylhydrazine, propylhydrazines, butylhydrazines, β - hydroxyethylhydrazine, cycloalkylhydrazines; arylhydrazines such as phenylhydrazine, o-, m-, and p-halophenylhydrazines, o-, m-, and p-tolylhydrazines, o-, m-, and p-alkoxyphenylhydrazines, o-, m-, and p-nitrophenylhydrazines, 1-hydrazinonaphthalene, 2-hydrazinopyridine, 3-hydrazinopyridine, 4-hydrazinopyridine, 4-hydrazinopyridine oxide, and 2-hydrazinopyrimidine; and aralkylhydrazines such as benzylhydrazine and phenylethylenehydrazine.

*Flow Sheet A*

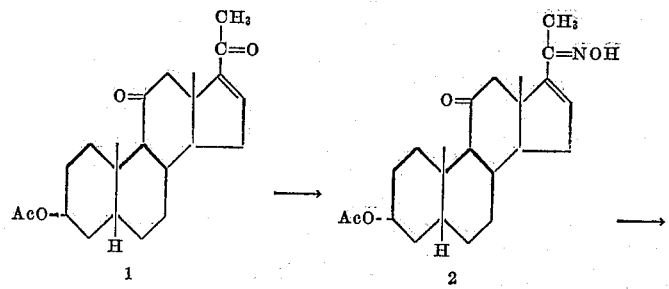

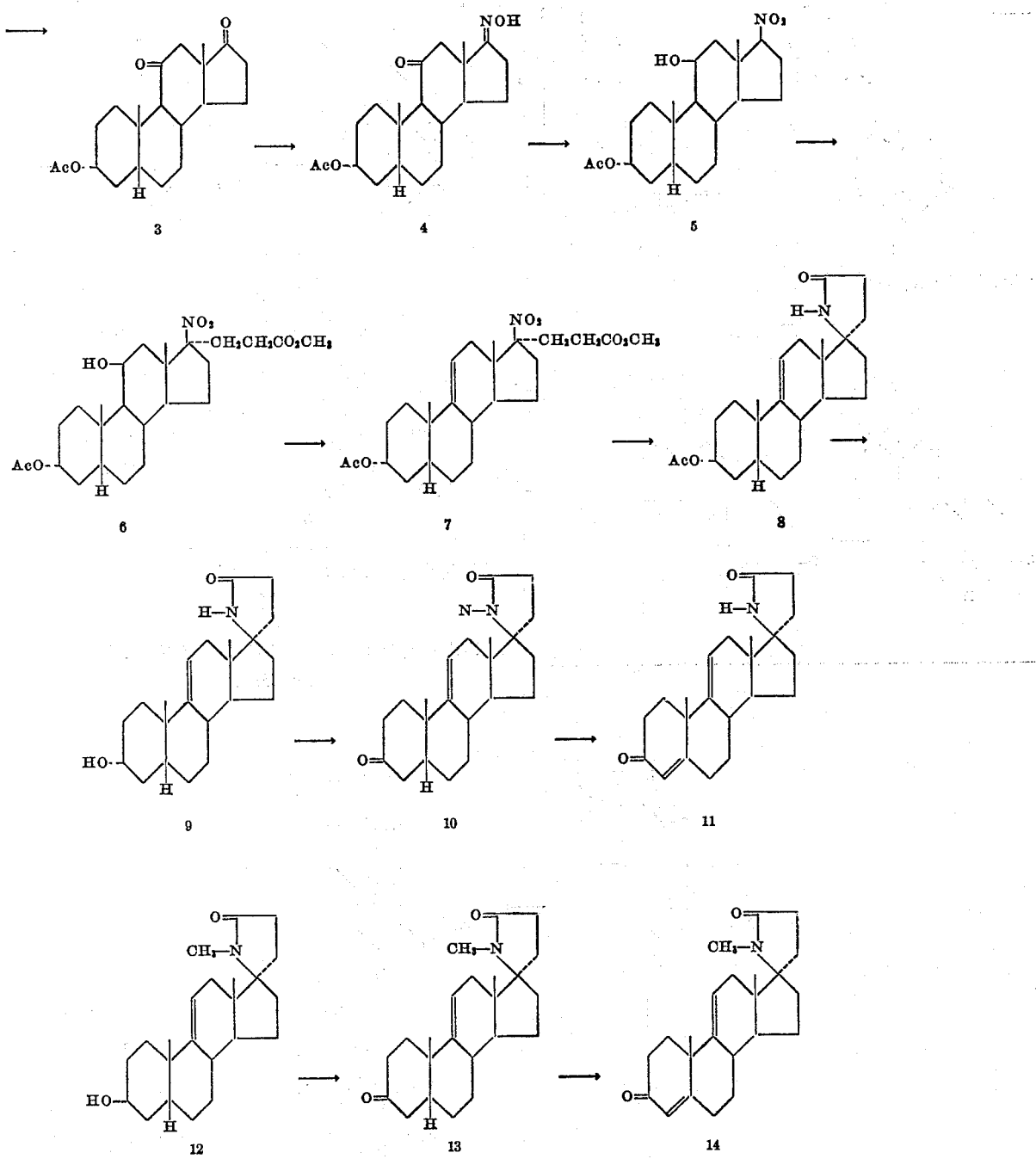
wherein Ac is acetate.
*Flow Sheet B*
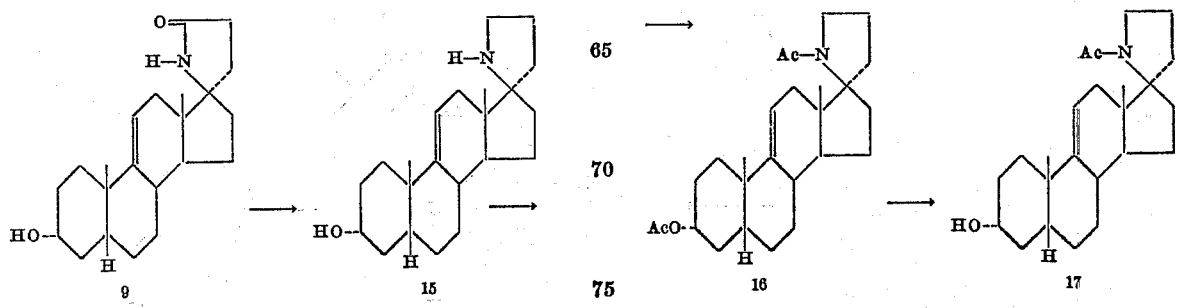

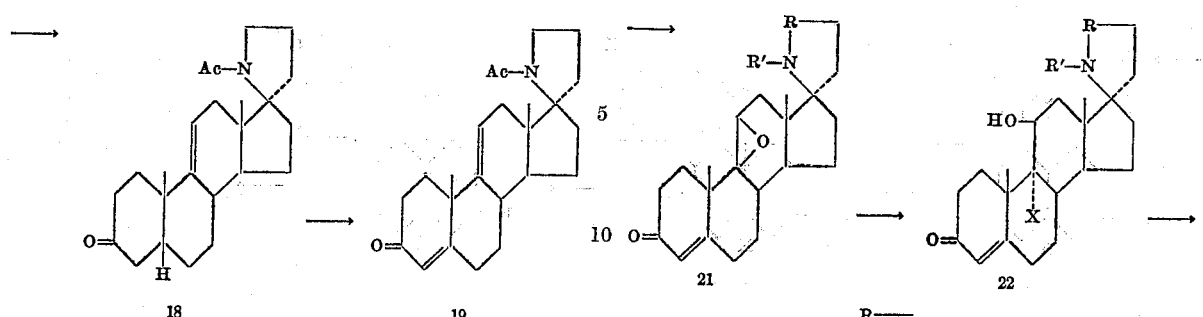
wherein Ac represents acyl.
*Flow Sheet C*
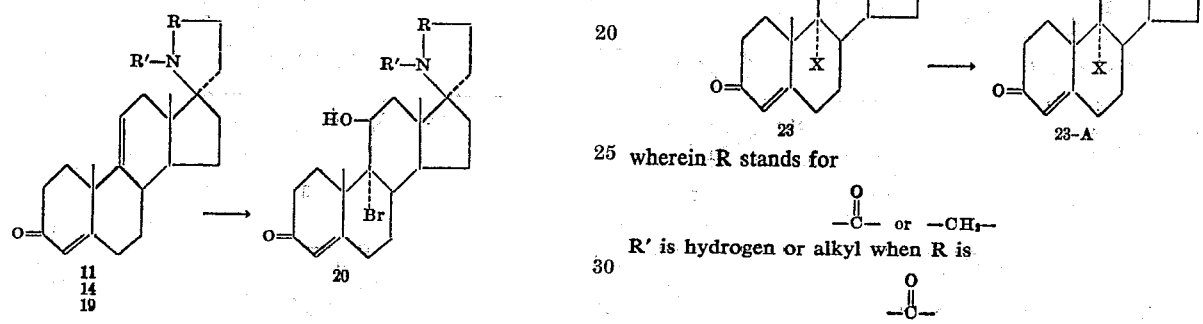
wherein R stands for
$$-\overset{O}{\underset{}{C}}-\quad \text{or} \quad -CH_2-$$
R' is hydrogen or alkyl when R is
$$-\overset{O}{\underset{}{C}}-$$
and R' is acyl when R is —CH$_2$—, and X is halogen.
*Flow Sheet D*
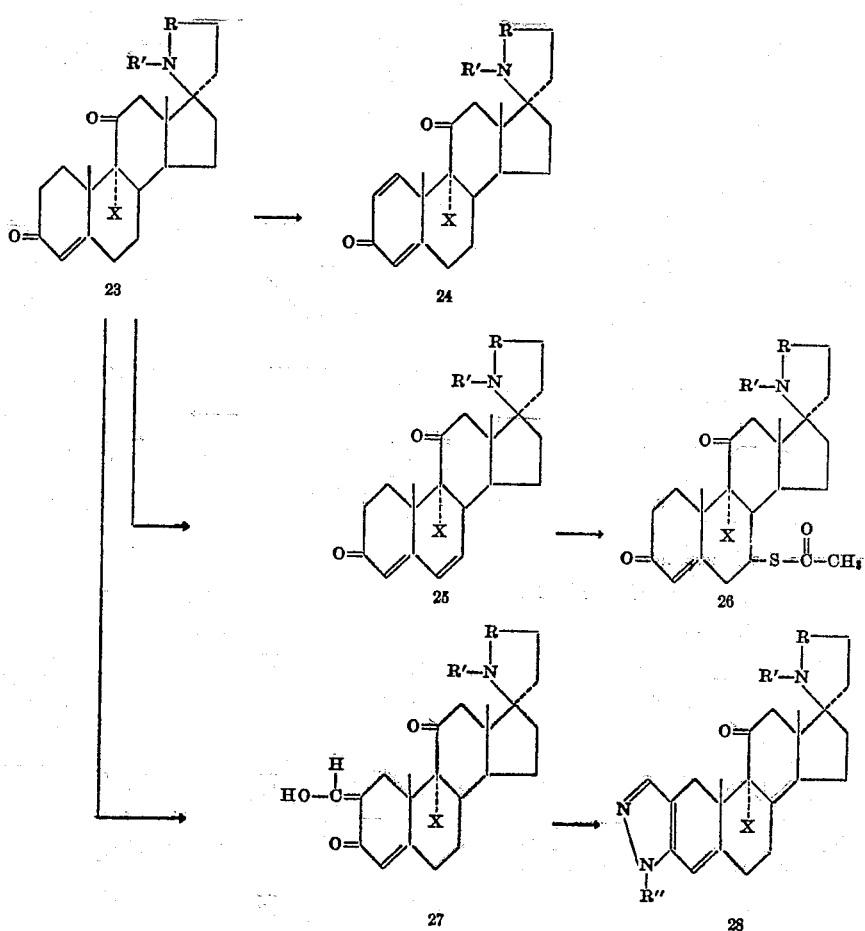

wherein R stands for

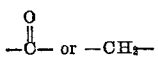

R' is hydrogen or alkyl when R is

and R' is acyl when R is —CH₂—, R" is hydrogen, alkyl, cycloalkyl, aryl or aralkyl, and wherein X is halogen.

The following examples illustrate methods of carrying out the present invention but it is to be understood that these examples are given for purposes of illustration and not of limitation.

EXAMPLE 1

A solution of 192 g. of 3α-acetoxy-16-pregnene-11,20-dione, 45 g. of hydroxylamine hydrochloride and 204 ml. of pyridine in 770 ml. of ethyl alcohol are refluxed for 0.5 hour. Then 195 ml. of hot water is added to the hot reaction mixture and the solution is allowed to cool slowly to room temperature. The crystalline precipitate is collected on a filter, washed with 400 ml. of 50% methanol-water solution and air dried to yield 187 g. of crude 3α-acetoxy-16-pregnene-11,20-dione 20-oxime.

EXAMPLE 2

A solution of 215 g. of crude 3α-acetoxy-16-pregnene-11,20-dione 20-oxime in 580 ml. of dry pyridine is cooled to between —5 and —10° C. To this is added dropwise and with stirring 258 g. of p-acetylaminobenzenesulfonyl chloride in 515 ml. of pyridine. This addition requires one and one-quarter hours. Stirring is continued at 0–5° C. for one hour, and then at 10–20° C. for three hours. One liter of water is added, and then 1.4 liters of mixed solvent is distilled from the mixture under reduced pressure. A solution of three hundred and fifty ml. of concentrated sulfuric acid in 2.6 liters of water is added and this mixture is heated and stirred vigorously at 80° C. for one hour. The brown oil is extracted four times with ether, washed once with aqueous sodium bicarbonate and then two times with water. After distillation of the dried ether, the residue is made crystalline by trituration with petroleum ether. Filtration affords 168 g. of a mixture of 3α-hydroxy-5β-androstane-11,17-dione and 3α-acetoxy-5β-androstane-11,17-dione.

A solution consisting of 74 g. of the above mixture, 360 ml. of pyridine and 80 ml. of acetic anhydride is heated on the steam bath for twenty minutes. Water is added cautiously to the cooled mixture to afford 75 g. of 3α-acetoxy-5β-androstane-11,17-dione.

EXAMPLE 3

A solution of 75 g. of 3α-acetoxy-5β-androstane-11,17-dione, 17.3 g. of hydroxylamine hydrochloride and 500 ml. of pyridine is heated on a steam cone at 90° C. for 2.5 hours. the solution is cooled and diluted with 300 ml. of water. The precipitate is collected on a filter, rinsed well with water and air dried to yield 68 g. of 3α-acetoxy-5β-androstane-11,17-dione-17-oxime. A sample for analysis melts at 190–193° C. after crystallization from methanol.

EXAMPLE 4

To a slurry of 110 g. of N-bromosuccinimide in 350 ml. of dioxane and 350 ml. of water there is added simultaneously 65 g. of 3α-acetoxy-5β-androstane-11,17-dione-17-oxime in 700 ml. of dioxane and 61 g. of potassium bicarbonate in 350 ml. of water. The mixture is stirred for 18 hours, diluted with water and extracted with ethyl acetate. The ethyl acetate extract is washed successively with a saturated ferrous sulfate solution (2 times), water, 10% sodium bisulfite (2 times) and again with water. After drying over anhydrous sodium sulfate, the ethyl acetate is removed under vacuum leaving a solid residue. This is dissolved in 1.8 liters of an 80% tetrahydrofuran-water solution and 31 g. of sodium borohydride is added over a 40 minute period with vigorous stirring. The mixture is stirred for 2.5 hours and 80 g. of hydroxylamine hydrochloride in 1.2 liters of water is added slowly. The solution is extracted with ether and the ether extract is washed successively with water, ferrous sulfate, water, sodium bisulfite and water. Concentration of the ether extract affords 13 g. of 3α-acetoxy-17β-nitro-5β-androstane-11β-ol. Chromatography over acid washed alumina yields an additional 7 g. of product. The analytical sample has a M.P. of 180–183° C.

EXAMPLE 5

To 19.2 g. of 3α-acetoxy-17β-nitro-5β-androstane-11β-ol in 290 ml. of methyl acrylate and 145 ml. of t-butanol there is added 29 ml. of methanolic tetramethylammonium hydroxide. The solution is left overnight in a stoppered flask and it is then poured into 100 ml. of 2.5 N hydrochloric acid and an equal volume of ice. The organic materials are extracted into ether which is washed once with 50 ml. of a saturated potassium bicarbonate solution and two times with water. The dried solvent is evaporated in vacuo until crystallization begins. The crystals are collected on a filter, washed with cold ether, and air dried to yield 20.7 g. of 3α-acetoxy-17α-[2'-methoxycarbonylethyl]-17β-nitro-5β-androstane-11β-ol, M.P. 214–220° C. A sample for analysis, after crystallization from ethyl acetate, melts at 220–222° C.

EXAMPLE 6

A solution consisting of 17.1 g. of 3α-acetoxy-17α-[2'-methoxycarbonylethyl]-17β-nitro-5β-androstane - 11β - ol, 102 ml. of dimethylformamide and 51 ml. of collidine is cooled to +10° C. Twenty ml. of methanesulfonylchloride is added and the reaction flask is immersed immediately in an oil bath maintained at 35° C. After 20 minutes the reaction mixture is poured into 1.5 liters of cold water and the solid is collected by filtration. Crystallization from methanol yields 11.7 g. of 3α-acetoxy-17α-[2'-methoxycarbonylethyl]-17β-nitro-9(11) - 5β - androstene, M.P. 127–130° C. The mother liquor is chromatographed over acid washed alumina and the 50% petroleum ether-ether eluates yields an additional 2.8 g. The analytical sample from methanol has a M.P. of 129–130 C.

EXAMPLE 7

To 12.2 g. of 3α-acetoxy-17α-[2'-methoxycarbonylethyl]-17β-nitro-9(11)-5β-androstene in 300 ml. of glacial acetic acid there is added 12.2 g. of zinc dust in small portions over a 65 minute period. After 1 hour, 12.2 g. more of zinc is added and the mixture is stirred for 18 hours. The mixture is filtered and the filtrate is evaporated under reduced pressure. Dilution with water and filtration yields 9.74 g. of 3-(3'α-acetoxy-17'β-amino-9'(11')5'β-androstene-17'α-yl)-propionic acid lactam, M.P. 230–235° C. (crystal change at 220° C.). A sample for analysis melts at 238–240° C. after crystallization from ethyl acetate.

EXAMPLE 8

To a solution of 3 g. of 3-(3'α-acetoxy-17'β-amino-9'(11')-5'β-androstene-17'α-yl)-propionic acid lactam in 94 ml. of methanol there is added a solution of 6.5 g. of potassium bicarbonate in 36 ml. of water. The solution is refluxed for four hours, cooled, poured into water and extracted with ethyl acetate. The ethyl acetate solution is washed with water, dried over anhydrous sodium sulfate and concentrated in vacuo. The crude product is crystallized from ethyl acetate to yield 2.71 g. of 3-(17'β-amino - 3'β - hydroxy - 9'(11') - 5'β - androstene - 17'α - yl)-propionic acid lactam, M.P. 179–183° C.

EXAMPLE 9

A solution of 3.5 g. of 3-(17'β-amino-3'β-hydroxy-9'(11')-5'β-androstene-17'α-yl)-propionic acid lactam in 20 ml. of pyridine is added slowly with stirring to a pyridine-chromic acid complex prepared from 3.5 g. of chromium trioxide and 20 ml. of pyridine. After 18 hours at room temperature the dark brown solution is poured into water and extracted two times with ethyl acetate.

The ethyl acetate is washed two times with dilute hydrochloric acid, three times with water and dried over sodium sulfate. The solvent is evaporated in vacuo and the residue is crystallized from ethyl acetate to yield 2.42 g. of 3-(17′β-amino-9′(11′)-5′β-androstene-3′-one-17′α-yl)-propionic acid lactam, M.P. 245–250° C. The analytical sample is crystallized from methanol, M.P. 255–258° C.

EXAMPLE 10

A solution of 1.26 g. of 3-(17′β-amino-9′(11′)-5′β-androstene-3′-one-17′α-yl)-propionic acid lactam, 21 ml. of chloroform, 5 ml. of glacial acetic acid and 0.5 ml. of HBr-acetic anhydride reagent is stirred at 0° C. The latter solution is prepared by adding 0.5 ml. of 48% hydrobromic acid to 2 ml. of cold acetic anhydride. To the reaction mixture there is added dropwise over a one-hour period 14 ml. of glacial acetic acid containing 670 mg. of bromine and 2 ml. of the HBr-acetic anhydride reagent. After stirring for an additional forty-five minutes, the reaction is quenched by the addition of 4 g. of potassium acetate. The mixture is poured into water, extracted with chloroform and the chloroform layer is washed with water, dried over sodium sulfate and concentrated in vacuo.

The crude product (1.6 g.) is heated in an oil bath at 120° C. for two hours with 30 ml. of dimethylformamide, 1.6 g. of lithium bromide and 1.6 g. of lithium carbonate. The reaction mixture is cooled, diluted with water and extracted with ethyl acetate. The organic layer is washed with water, dried over sodium sulfate and concentrated in vacuo. Crystallization from ethyl acetate yields 560 mg. of 3-(17′β-amino-4′,9′(11′)-androstadiene-3′-one-17′α-yl)-propionic acid lactam, M.P. (decomp.) 288–294° C. The analytical sample is crystallized from methanol, M.P. (decomp.) 294–298° C., ultraviolet absorption $\lambda_{max}$ 238 m$\mu$, $\epsilon$ 15,640.

EXAMPLE 11

Five-hundred mg. of 3-(17′β-amino-3′β-hydroxy-9′(11′)-5′β-androstene-17′α-yl)-propionic acid lactam is reacted at room temperature for eighteen hours with 50 ml. of dry dihydropyran and 150 mg. of p-toluenesulfonyl chloride. This mixture is then diluted with 5% sodium bicarbonate solution and a crystalline precipitate of the 3-(17′β-amino-3′β-hydroxy-9′(11′)-5′β-androstene-17′α-yl)-propionic acid lactam 3′β-tetrahydropyranyl ether is collected.

A solution is prepared of 250 mg. of this tetrahydropyranyl ether in 8 ml. of dimethylformamide and 16 ml. of benzene. Eight ml. of benzene is distilled off to insure dryness. After the addition of 80 mg. of sodium hydride, a yellow anion developed. Two ml. of methyl iodide is added and the mixture is stirred overnight under nitrogen and then refluxed for one hour. The mixture is diluted with benzene, washed with water, dried and evaporated to yield crude 3-(3′α-hydroxy-17′β-methylamino-9′(11′)-5′β-androstene-17′α-yl)-propionic acid lactam 3′β-tetrahydropyranyl ether.

The reversal of the ether at C-3′ is accomplished by adding the steroid to a mixture of 20 mg. of p-toluene sulfonic acid in 10 ml. of ethanol. After eighteen hours at room temperature, some of the ethanol is removed on the rotator, water is added and the product is extracted into ethyl acetate. The solvent is washed with dilute sodium bicarbonate, dried and evaporated. Recrystallization of the residue from methylene chloride-ether yields 3-(3′-α-hydroxy-17′β-methylamino-9′(11′)-5′β-androstene-17′α-yl)-propionic acid lactam.

EXAMPLE 12

A solution of 3.5 g. of 3-(3′α-hydroxy-17′β-methylamino-9′(11′)-5′β-androstene-17′α-yl)-propionic acid lactam in 20 ml. of pyridine is added slowly with stirring to a pyridine chromic acid complex prepared from 3.5 g. of chromium trioxide and 20 ml. of pyridine. After 18 hours at room temperature the dark brown solution is poured into water and extracted two times with ethyl acetate. The ethyl acetate is washed two times with dilute hydrochloric acid, three times with water and dried over sodium sulfate. The solvent is evaporated in vacuo and the residue is crystallized from ethyl acetate to give 3-(17′β-methylamino-9′(11′)-5′β-androstene-3′-one-17′α-yl)-propionic acid lactam.

EXAMPLE 13

A solution of 1.26 g. of 3-(17′β-methylamino-9′(11′)-5′β-androstene-3′-one-17′α-yl)-propionic acid lactam, 21 ml. of chloroform, 5 ml. of glacial acetic acid and 0.5 ml. of HBr-acetic anhydride reagent is stirred at 0° C. The latter solution is prepared by adding 0.5 ml. of 48% hydrobromic acid to 2 ml. of cold acetic anhydride. To the reaction mixture there is added dropwise over a one-hour period 14 ml. of glacial acetic acid containing 670 mg. of bromine and 2 ml. of the HBr-acetic anhydride reagent. After stirring for an additional forty-five minutes, the reaction is quenched by the addition of 4 g. of potassium acetate. The mixture is poured into water, extracted with chloroform and the chloroform layer is washed with water, dried over sodium sulfate and concentrated in vacuo.

The crude product (1.6 g.) is heated in an oil bath at 120° C. for two hours with 30 ml. of dimethylformamide, 1.6 g. of lithium bromide and 1.6 g. of lithium carbonate. The reaction mixture is cooled, diluted with water and extracted with ethyl acetate. The organic layer is washed with water, dried over sodium sulfate and concentrated in vacuo. Crystallization from ethyl acetate yields 3-(17′β-methylamino-4′,9′(11′)-androstadiene-3′-one-17′α-yl)-propionic acid lactam.

EXAMPLE 14

One gram of 3-(17′β-amino-3′β-hydroxy-9′(11′)-5′β-androstene-17′α-yl)-propionic acid lactam is refluxed with three grams of lithium aluminum hydroide in 400 ml. of purified dioxane for ninety hours. Ether and saturated aqueous sodium potassium tartrate are added carefully to the cooled solution. This mixture is filtered through Supercel (an infusorial earth) and then concentrated in vacuo to remove most of the dioxane. Dilute sodium hydroxide is added and the desired amine is brought into ethyl acetate with several extractions. Removal of the washed and dried solvent leaves 3α-hydroxy-9(11)-5β-androstene-17-spiro-2′-(1′-2′)β-pyrrolidene.

EXAMPLE 15

The diacetylation of 250 mg. of 3α-hydroxy-9(11)-5β-androstene-17-spiro-2′-(1′-2′)β-pyrrolidene is accomplished with 2.5 ml. of acetic anhydride and 2.5 ml. of pyridine. This mixture is heated on the steam bath under nitrogen for one and one-half hours. It is then taken to dryness on the rotating evaporator and the residue is crystallized from methylene chloride-ether to give 3α-acetoxy-9(11)-5β-androstene-17-spiro-2′-(1′-2′)β-1′-acetylpyrrolidene.

The diformylation of 250 mg. of 3α-hydroxy-9(11)-5β-androstene-17-spiro-2′-(1′-2′)β-pyrrolidene is accomplished by adding the compound at 0° C. to 2 ml. of acetic anhydride in 5 ml. of 98% formic acid. The mixture is allowed to come to room temperature and after eighteen hours, excess reagent is removed at room temperature on the rotating evaporator. The residue is crystallized from methylene chloride-ether to give 3α-formyloxy-9(11)-5β-androstene-17-spiro-2′-(1′-2′)β-1′-formylpyrrolidene.

EXAMPLE 16

To a solution of 3 g. of 3α-acetoxy-9(11)-5β-androstene-17-spiro-2′-(1′-2′)β-1′-acetylpyrrolidene in 94 ml. of methanol there is added a solution of 6.5 g. of potassium bicarbonate in 36 ml. of water. The solution is refluxed for four hours, cooled, poured into water and extracted with ethyl acetate. The ethyl acetate solution is washed with water, dried over anhydrous sodium sulfate and concentrated in vacuo. The crude product is crystallized from ethyl acetate to yield 3α-hydroxy-9(11)-5β-androstene-17-spiro-2'-(1'-2')β-1'-acetylpyrrolidene.

In accordance with the above procedure, but starting with the corresponding 3α-formyloxy-9(11)-5β-androstene-17-spiro-2'-(1'-2')β-1'-formylpyrrolidene, there is obtained the corresponding 3α-hydroxy-9(11)-5β-androstene-17-spiro-2'-(1'-2')β-1'-formylpyrrolidene.

EXAMPLE 17

A solution of 3.5 g. of 3α-hydroxy-9(11)-5β-androstene-17-spiro-2'-(1'-2')β-1'-acetylpyrrolidene in 20 ml. of pyridine is added slowly with stirring to a pyridine-chromic acid complex prepared from 3.5 g. of chromium trioxide and 20 ml. of pyridine. After 18 hours at room temperature, the dark brown solution is poured into water and extracted two times with ethyl acetate. The ethyl acetate is washed two times with dilute hydrochloric acid, three times with water and dried over sodium sulfate. The solvent is evaporated in vacuo and the residue is crystallized from ethyl acetate to yield 9(11)-5β-androstene-3-one-17-spiro-2'-(1'-2')β-pyrrolidene.

In accordance with the above procedure, but starting with 3α-hydroxy-9(11)-5β-androstene-17-spiro-2'-(1'-2')β-1'-formylpyrrolidene in place of 3α-hydroxy-9(11)-5β-androstene-17-spiro-2'-(1'-2')β-1'-acetylpyrrolidene there is obtained the 9(11)-5β-androstene-3-one-17-spiro-2'-(1'-2')β-1'-formylpyrrolidene.

EXAMPLE 18

A solution of 1.26 g. of 9(11)-5β-androstene-3-one-17-spiro-2'(1'-2')β-1'-acetylpyrrolidene, 21 ml. of chloroform, 5 ml. of glacial acetic acid and 0.5 ml. of HBr-acetic anhydride reagent is stirred at 0° C. The latter solution is prepared by adding 0.5 ml. of 48% hydrobromic acid to 2 ml. of cold acetic anhydride. To the reaction mixture there is added dropwise over a one-hour period 14 ml. of glacial acetic acid containing 670 mg. of bromine and 2 ml. of the HBr-anhydride reagent. After stirring for an additional forty-five minutes, the reaction is quenched by the addition of 4 g. of potassium acetate. The mixture is poured into water, extracted with chloroform and the chloroform layer is washed with water, dried over sodium sulfate and concentrated in vacuo.

The crude product (1.6 g.) is heated on an oil bath at 120° C. for two hours with 30 ml. of dimethylformamide, 1.6 g. of lithium bromide and 1.6 g. of lithium carbonate. The reaction mixture is cooled, diluted with water and extracted with ethyl acetate. The organic layer is washed with water, dried over sodium sulfate and concentrated in vacuo. Crystallization from ethyl acetate yields 4,9-(11)-androstadiene-3-one-17-spiro-2'-(1'-2')β-1'-acetylpyrrolidene.

In accordance with the above procedure, but starting with the 9(11)-5β-androstene-3-one-17-spiro-2'-(1'-2')β-1'-acetylpyrrolidene, there is obtained the corresponding 4,9(11)-androstadiene-3-one-17-spiro-2'-(1'-2')β-1'-formylpyrrolidene.

EXAMPLE 19

0.71 milliliters of 0.2 N perchloric acid is added with stirring to a suspension of 200 mg. of 3-(17'β-amino-4',9'-(11')-androstadiene-3'-one-17'α-yl)-propionic acid lactam, 135 mg. of N-bromosuccinimide and 4 ml. of dioxane at 5° C. This mixture is left in the refrigerator for three and one-half hours and is then diluted carefully with water until a precipitate occurs. The crystals are collected on a filter, washed two times with water and dried to yield 176 mg. of crude 3-(17'β-amino-9'α-bromo-11'β-hydroxy-4'-androstene-3'-one-17'α-yl)-propionic acid lactam.

To a suspension of 176 mg. of the above compound in 5 ml. of dry methanol there is added 0.5 ml. of a 1 N sodium methoxide solution, and the mixture is stirred at room temperature for 10 minutes. The reaction is terminated by the addition of glacial acetic acid and ice-water. After cooling, the crystalline precipitate is collected, washed with water and dried in vacuo to yield 120 mg. of 3-(17'β-amino-9',11' - epoxy-4'-androstene-3'-one-17'α-yl)-propionic acid lactam. Two crystallizations from ethyl acetate affords the analytical sample, M.P. (decomp.) 282–286° C. ultraviolet absorption at $\lambda_{max}$ 243 mµ, $\epsilon$14,240.

A hydrogen fluoride solution is prepared at −60° C. from 10.4 g. of anhydrous hydrogen fluoride, 14.3 ml. of tetrahydrofuran and 7.5 ml. of chloroform. One and one-half cc. of this solution is kept at −60° C. and to it is added 54 mg. of 3-(17'β-amino-9',11'-epoxy-4'-androstene-3'-one-17'α-yl)-propionic acid lactam in 0.75 ml. of chloroform likewise chilled at −60° C. The reaction mixture is maintained at −40° C. for two and one-half hours and then it is added to a well agitated mixture of aqueous potassium carbonate, chloroform and ice. The organic layer is washed two times with water, dried over sodium sulfate and concentrated in vacuum. Crystallization from ethyl acetate yields 30 mg. of 3-(17'β-amino-9'α-fluoro-11'β-hydroxy-4'-androstene - 3' - one-17'α-yl)-propionic acid lactam, M.P. (decomp.) 310–320° C. with ultraviolet absorption at $\lambda_{max}$ 238 mµ, $\epsilon$ 15,980.

A solution of 400 mg. of 3-(17'β-amino-9'α-fluoro-11'β-hydroxy-4'-androstene-3'-one-17'α-yl)-propionic acid lactam in 4 ml. of pyridine is added to the complex formed by the addition of 400 mg. of chromium trioxide to 4 ml. of pyridine. The mixture is swirled until thoroughly mixed and then allowed to stand at room temperature overnight. The reaction mixture is poured into water, and the aqueous mixture is extracted with ether and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo, and the residual crystalline material is purified by crystallization from a mixture of ethyl acetate and ether to give 3-(17'β-amino-9'α-fluoro-4'-androstene-3',11'-dione-17'α-yl)-propionic acid lactam.

In accordance with all of the above procedures, but starting with 3-(17'β-methylamino-4',9'(11')-androstadiene-3'-one-17'α-yl)-propionic acid lactam, or 4,9-(11)-androstadiene-3-one-17-spiro-2'-(1'-2')β-1'-acylpyrrolidene in place of 3-(17'β-amino-4',9'(11') - androstadiene-3'-one-17'α-yl)-propionic acid lactam, there is obtained the corresponding 3-(9'α-fluoro-17'β-methylamino-4'-androstene-3',11'-dione-17'α-yl)-propionic acid lactam, 9α-fluoro-4-androstene - 3,11-dione-17-spiro-2'-(1'-2')β-1'-acylpyrrolidene.

A solution of 250 mg. of 9α-fluoro-4-androstene-3,11-dione-17-spiro-2'-(1'-2')β-1'-formylpyrrolidene in 10 cc. of ethanol containing 2 cc. of concentrated hydrochloric acid is refluxed for 4 hours. Evaporation of the solvent under reduced pressure leaves the hydrochloride of 9α-fluoro-4-androstene - 3,11 - dione-17-spiro-2'-(1'-2')β-pyrrolidene. The hydrochloride is treated with alkali in an inert solvent and is chromatographed on basic alumina to yield the purified free base.

EXAMPLE 20

To 100 mg. of 3-(17'β-amino-9'α-fluoro-4'-androstene-3',11'-dione-17'α-yl)-propionic acid lactam in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed for an additional 24 hours. The mixture is filtered and the filtrate evaporated to dryness. The residue is extracted with ethyl acetate and the extract is washed successively with aqueous sodium bicarbonate, ammonium sulfide, dilute ammonia water, water, dilute hydrochloric acid and water, and then dried over magnesium sulfate. The extract is treated with activated charcoal and then concentrated to dryness. Crystallization of the residue from a mixture of acetone and ether gives 3-(17'β-amino-9'α-fluoro-1',4'-androstadiene-3',11'-dione-17'α-yl)-propionic acid lactam.

In accordance with the above procedure, but starting with 3-(9'α-fluoro-17'β-methylamino-4'-androstene-3',11'-dione-17'α-yl)-propionic acid lactam or 9α-fluoro-4-androstene-3,11-dione-17-spiro-2'-(1'-2')β-1' - acetylpyrrolidene in place of 3-(17'β-amino-9'α-fluoro-4'-androstene-3',11'-dione-17'α-yl)-propionic acid lactam, there is obtained the corresponding 3-(9'α-fluoro-17'β - methylamino-1',4'-androstadiene-3',11'-dione-17'α-yl)-propionic acid lactam or 9α-fluoro-1,4-androstadiene-3,11 - dione-17-spiro-2'-(1'-2')β-1'-acetylpyrrolidene.

EXAMPLE 21

A solution of 200 mg. of 3-(17'β-amino-9'α-fluoro-4'-androstene-3',11'-dione-17'α-yl)-propionic acid lactam and 400 mg. of chloranil in 30 ml. of t-butanol are refluxed overnight. The mixture is then taken down to dryness in vacuo and chromatographed on silica gel. Elution with chloroform-acetone (1:1) affords 3-(17'β-amino-9'α-fluoro-4',6'-androstadiene-3',11'-dione-17'α-yl) - propionic acid lactam.

To 10 ml. of freshly distilled thioacetic acid there is added 150 mg. of 3-(17'β-amino-9'α-fluoro-4',6'-androstadiene-3',11'-dione-17'α-yl)-propionic acid lactam. This solution is heated on the steam bath under nitrogen for one-half hour and excess thioacetic acid is blown off with nitrogen. The residue is taken up in ethyl acetate and washed with sodium bicarbonate and water. Removal of the dried solvent and trituration with methanol gives 3-(7'α-acetylthio-17'β-amino-9'α-fluoro-4'-androstene-3',11'-dione-17'α-yl)-propionic acid lactam.

In accordance with the above procedures, but starting with the 3-(9'α-fluoro-17'β - methylamino-4'-androstene-3',11'-dione-17'α-yl)-propionic acid lactam or 9α-fluoro-4-androstene - 3,11 - dione-17-spiro-2'-(1'-2')β-1'-acetylpyrrolidene in place of 3-(17'β-amino-9'α-fluoro-4'-androstene-3',11'-dione-17'α-yl)-propionic acid lactam there is obtained as product the corresponding 3-(7'α-acetylthio-9'α - fluoro-17'β-methylamino-4'-androstene-3',11'-dione-17'α-yl)-propionic acid lactam or 7α-acetylthio-4-androstene-3,11-dione-17-spiro-2'-(1'-2')β-1'-acetylpyrrolidene.

EXAMPLE 22

A suspension of 610 mg. of 3-(17'β-amino-9'α-fluoro-4'-androstene-3',11',-dione-17'α - yl) - propionic acid lactam in 50 ml. of dry benzene is stirred in a nitrogen atmosphere with 1 ml. of ethyl formate and 450 mg. of a suspension of about 54% sodium hydride in mineral oil at room temperature for 19 hours. Stirring is continued for 2 more hours after the addition of 1 ml. of ethyl formate and 350 mg. of sodium hydride. The reaction mixture is chilled in an icebath and acidified with an excess of an aqueous solution of sodium dihydrogen phosphate. The layers are separated and the aqueous phase is extracted with ether, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochloric gives a product which is taken up in methylene chloride. The solution is filtered and evaporated to dryness, to give 3-(17'β-amino-9'α - fluoro - 2' - hydroxymethylene - 4'-androstene-3',11'-dione-17'α-yl)-propionic acid lactam.

A suspension of 610 mg. of 3-(17'β-amino-9'α-fluoro-2' - hydroxymethylene - 4' - androstene - 3',11' - dione-17'α-yl)-propionic acid lactam in 50 ml. of dry benzene is stirred in a nitrogen atmosphere with 1 ml. of ethyl formate and 450 mg. of a suspension of about 54% sodium hydride in mineral oil at room temperature for 19 hours. Stirring is continued for 2 more hours after the addition of 1 ml. of ethyl formate and 350 mg. of sodium hydride. The reaction mixture is chilled in an icebath and acidified with an excess of an aqueous solution of sodium dihydrogen phosphate. The layers are separated and the aqueous phase is extracted with ether, with ethyl actate and with methylene chloride. The combined organic layers are extracted with sodium bicarbonate to remove impurities. The product is then extracted into a 2% aqueous solution of sodium hydroxide. Acidification of the alkaline extracts with dilute hydrochloric acid gives a product which is taken up in methylene chloride. The solution is filtered and evaporated to dryness, to give 3-(17'β-amino-[3',2'-c]pyrazolo-4'-androstene-11'-one-17'α - yl) - propionic acid lactam.

In accordance with the above procedures, but starting with 3 - (9'α-fluoro-17'β-methylamino-4'-androstene-3',11'-dione-17'α-yl)-propionic acid lactam or 9α-fluoro-4-androstene-3,11-dione - 17 - spiro-2'-(1'-2')β-1'-acetylpyrrolidene in place of 3-(17'β-amino-9'α-fluoro-4'-androstene-3',11'-dione-17'α-yl)-propionic acid lactam there is obtained as product the corresponding 3-(17'β-methylamino - [3',2'-c]pyrazolo-4'-androstene-11' - one - 17'α-yl)-propionic acid lactam or 9α-fluoro-[3,2-c]pyrazolo-4-androstene-3,11-dione-17-spiro - 2' - (1'-2')β-1'-acetylpyrrolidene.

Various changes and modifications may be made in carrying out the present invention without departing from the spirit and scope thereof. Insofar as these changes and modifications are within the purview of the annexed claims, they are to be considered as part of our invention.

We claim:

1. A compound of the formula—

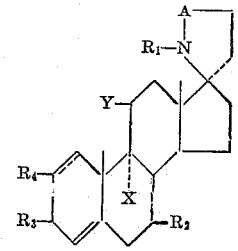

in which $R_1$ is selected from the group consisting of hydrogen, methyl, and carboxylic acyl, A is selected from the group consisting of carbonyl and methylene, $R_2$ is selected from the group consisting of hydrogen and lower alkanoylthio, $R_3$ is selected from the group consisting of α-hydroxyl, keto, and, together with $R_4$, a group—

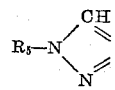

in which $R_5$ is selected from the group consisting of lower alkyl, hydroxyalkyl, cycloalkyl, phenyl, tolyl, alkoxyphenyl, nitrophenyl, naphthyl pyridyl, N-oxidopyridyl, pyrimidyl, benzyl and phenethyl, $R_4$ is selected from the group consisting of hydrogen and, together with $R_3$, a pyrazolo group as defined above, X is selected fro mthe group consisting of hydrogen, halogen and, together with Y, 9 (11) double bonds and epoxy groups, Y is selected from the group consisting of keto oxygen, β-hydroxyl and, together with X, 9 (11) double bonds and epoxy groups, and the dotted lines in the 1, 2, and 3 and 5, 6 positions show that each of these bonds is selected from the group consisting of single and double bonds.

2. 3α-acetoxy-17β-nitro-5β-androstane-11β-ol.

3. 3α-acetoxy - 17α-[2'-methoxycarbonylethyl] - 17β-nitro-9(11)-5β-androstene.

4. 3-(17'β-amino-3'α-hydroxy - 9'(11') - 5'β - androstene-17'α-yl)-propionic acid lactam.
5. 3-(17'β-amino-4',9'(11') - androstadiene - 3' - one-17'α-yl)-propionic acid lactam.
6. 3-(17'β-methylamino-4',9'(11') - androstadiene - 3'-one-17'α-yl)-propionic acid lactam.
7. 4,9(11) - androstadiene - 3 - one - 17 - spiro - 2'-(1'-2')β-pyrrolidine.
8. 4,9(11)-androstadiene - 3 - one-17-spiro-2'-(1'-2')β-1'-acetylpyrrolidine.
9. 3-(17'β-amino-9'α-fluoro - 11'β - hydroxy-4'-androstene-3'-one-17'α-yl)-propionic acid lactam.
10. 3-(9'α-fluoro-11'β - hydroxy-17'β-methylamino-4'-androstene-3'-one-17'α-yl)-propionic acid lactam.
11. 9α-fluoro - 11β - hydroxy-4-androstene-3-one-17-spiro-2'-(1'-2')β-1'acetylpyrrolidine.
12. 3-(17'β-amino-9'α-fluoro-4'-androstene-3',11'-dione-17'α-yl)-propionic acid lactam.
13. 3-(9'α-fluoro-17'β-methylamino-4'-androstene-3',11'-dione-17'α-yl)-propionic acid lactam.
14. 9α - fluoro - 4-androstene-3,11-dione-17-spiro-2'-(1'-2')β-pyrrolidine.
15. 3-(17'β-amino-9'α-fluoro-1',4'-androstadiene-3',11'-dione-17'α-yl)-propionic acid lactam.
16. 3-(9'α-fluoro-17'β-methylamino-1',4'-androstadiene-3',11'-dione-17'α-yl)-propionic acid lactam.
17. 3-(7'α-alkanoylthio-17'β-amino-9'α-fluoro-4'-androstene-3',11'-dione-17'α-yl)-propionic acid lactam.
18. 3-(7'α-alkanoylthio-9'α-fluoro-17'β-methylamino-4'-androstene-3',11'-dione-17'α-yl)-propionic acid lactam.
19. 7α-alkanoylthio-4-androstene-3,11-dione -17 - spiro-2'-(1'-2')β-1'-acetylpyrrolidine.
20. 3-(17'β-amino-[3',2'-c]pyrazolo-4'-androstene-11'-one-17'α-yl)-propionic acid lactam.
21. 3 - (17'β - methylamino - [3',2'-c]pyrazolo-4'-androstene-11'-one-17'α-yl)-propionic acid lactam.
22. 9α-fluoro-[3,2-c]pyrazolo-4-androstene-3,11-dione-17-spiro-2'-(1'-2')β-pyrrolidine.
23. 9α-fluoro-[3,2-c]pyrazolo-4-androstene-3,11 - dione-17-spiro-2'-(1'-2')β-1'-acetylpyrrolidine.
24. The process for the preparation of 3α-hydroxy-9(11)-5β-androstene-17-spiro-2'-(1'-2')β-pyrrolidine which comprises reducing 3-(17'β-amino-3'β-hydroxy-9'(11')-5'β-androstene-17'α-yl)-propionic acid lactam with lithium aluminum hydride.

References Cited in the file of this patent
UNITED STATES PATENTS
3,001,986    Burtner et al. _____ Sept. 26, 1961
OTHER REFERENCES
Fieser et al.: Steroids (1959), page 552, Reinhold Pub. Co., New York, N.Y.